(12) United States Patent
Berndt et al.

(10) Patent No.: US 9,950,684 B2
(45) Date of Patent: Apr. 24, 2018

(54) METHOD AND DEVICE FOR CHECKING A SENSOR SIGNAL AND FOR ACTUATING A PASSENGER PROTECTION MEANS OF A VEHICLE

(75) Inventors: Steffen Berndt, Eberdingen-Hochdorf (DE); Martin Schweizer, Kleinglattbach (DE); Stefan Lottholz, Reutlingen (DE); Werner Nitschke, Asperg (DE); Monika Nitschke, legal representative, Asperg (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/116,658

(22) PCT Filed: Mar. 13, 2012

(86) PCT No.: PCT/EP2012/054314
§ 371 (c)(1),
(2), (4) Date: Feb. 21, 2014

(87) PCT Pub. No.: WO2012/152473
PCT Pub. Date: Nov. 15, 2012

(65) Prior Publication Data
US 2014/0288780 A1    Sep. 25, 2014

(30) Foreign Application Priority Data

May 10, 2011 (DE) .......... 10 2011 075 545

(51) Int. Cl.
*B60R 21/017*  (2006.01)
*B60R 21/013*  (2006.01)
*B60R 21/01*   (2006.01)

(52) U.S. Cl.
CPC ........ *B60R 21/0173* (2013.01); *B60R 21/013* (2013.01); *B60R 2021/0119* (2013.01); *B60R 2021/01184* (2013.01)

(58) Field of Classification Search
CPC ... B60R 21/013; B60R 21/0132; B60R 21/01; B60R 21/0136; B60R 2021/01122;
(Continued)

(56) References Cited

U.S. PATENT DOCUMENTS 5,040,118 A    8/1991  Diller
5,363,303 A *  11/1994 Kaneko et al. ................. 701/45
(Continued)

FOREIGN PATENT DOCUMENTS

DE    100 62 427    7/2002
DE    43 02 399     12/2003
(Continued)

*Primary Examiner* — Thomas G Black
*Assistant Examiner* — Sze-Hon Kong
(74) *Attorney, Agent, or Firm* — Norton Rose Fulbright US LLP; Gerard Messina

(57) ABSTRACT

A method for checking a sensor signal suitable for actuating a passenger protection arrangement of a vehicle. The method includes a step of carrying out a comparison between the sensor signal and at least one reference signal, repeatedly within a predetermined time interval, in order to obtain a plurality of comparison results, and a step of evaluating the sensor signal based on the plurality of comparison results, in order to detect a fault in the sensor signal.

13 Claims, 2 Drawing Sheets

(58) Field of Classification Search
CPC . B60R 2021/01129; B60R 2021/01184; B60R 21/0173; B60R 2021/0119
USPC .......................................................... 701/45
See application file for complete search history.

(56) References Cited

U.S. PATENT DOCUMENTS

| | | | | |
|---|---|---|---|---|
| 5,754,963 | A * | 5/1998 | Nunneley | G01R 31/2829 324/537 |
| 5,904,723 | A * | 5/1999 | Kiribayashi et al. | 701/45 |
| 5,964,816 | A * | 10/1999 | Kincaid | B60R 21/01 180/271 |
| 6,018,980 | A * | 2/2000 | Kimura et al. | 73/12.04 |
| 6,023,664 | A * | 2/2000 | Bennet | B60R 21/0132 701/45 |
| 6,223,104 | B1 * | 4/2001 | Kamen | A61G 5/061 180/7.1 |
| 6,615,122 | B1 * | 9/2003 | Yamashita | B60R 21/013 180/271 |
| 6,859,706 | B1 * | 2/2005 | Schmidt | 701/45 |
| 7,254,520 | B2 * | 8/2007 | Hashemian | 702/183 |
| 7,281,599 | B2 * | 10/2007 | Takeuchi et al. | 180/274 |
| 7,422,086 | B2 | 9/2008 | Bujak | |
| 2002/0198645 | A1 * | 12/2002 | Ishida | B60N 2/002 701/45 |
| 2003/0120408 | A1 * | 6/2003 | Caruso | B60R 21/0136 701/45 |
| 2004/0002815 | A1 * | 1/2004 | Ishizaki | B60R 21/0132 701/300 |
| 2004/0007860 | A1 * | 1/2004 | Miyata et al. | 280/735 |
| 2005/0167960 | A1 * | 8/2005 | Tanaka et al. | 280/735 |
| 2005/0200105 | A1 * | 9/2005 | Mihara et al. | 280/735 |
| 2006/0016260 | A1 * | 1/2006 | Smith | 73/504.03 |
| 2006/0241834 | A1 * | 10/2006 | Kithil | B60R 21/013 701/45 |
| 2007/0033511 | A1 * | 2/2007 | Davies | G06F 11/1675 714/799 |
| 2007/0168096 | A1 * | 7/2007 | Boutin | G05B 9/03 701/45 |
| 2008/0255717 | A1 * | 10/2008 | Lich et al. | 701/29 |
| 2008/0259729 | A1 * | 10/2008 | Griffin | B60R 21/0136 367/117 |
| 2009/0210117 | A1 * | 8/2009 | Oowada | B60R 21/0132 701/46 |
| 2010/0010778 | A1 * | 1/2010 | Schruellkamp | 702/189 |
| 2010/0121534 | A1 * | 5/2010 | Tanaka | H04L 12/40039 701/45 |
| 2011/0187546 | A1 * | 8/2011 | Liberman | B60R 21/0132 340/669 |
| 2012/0253746 | A1 * | 10/2012 | Kolar | G05B 23/0221 702/188 |

FOREIGN PATENT DOCUMENTS

| | | |
|---|---|---|
| DE | 10 2005 033918 | 1/2007 |
| EP | 0 720 004 | 7/1996 |
| WO | 9912779 A1 | 3/1999 |
| WO | 0234579 A | 5/2002 |
| WO | 2004/065163 | 8/2004 |

\* cited by examiner ers is not an arbitrary number, but may orient itself on a statistical expected value, at which a faulty sensor signal can reliably be detected.-->

METHOD AND DEVICE FOR CHECKING A SENSOR SIGNAL AND FOR ACTUATING A PASSENGER PROTECTION MEANS OF A VEHICLE

FIELD OF THE INVENTION

The present invention relates to a method for checking a sensor signal that is suitable for actuating a passenger protection arrangement of a vehicle, a method for actuating a passenger protection arrangement of a vehicle, a corresponding device as well as a corresponding computer program product.

BACKGROUND INFORMATION

German document DE 43 02 399 C2 discusses a method for checking an electronic device, which includes at least two acceleration-sensitive sensor systems. In this instance, output signals of the two sensor systems are integrated within a time window if the output signals exceed a minimum acceleration value.

SUMMARY OF THE INVENTION

With this as background, the present invention introduces a method for checking a sensor signal that is suitable for actuating a passenger protection arrangement of a vehicle, a method for actuating a passenger protection arrangement of a vehicle, furthermore a device which uses at least one of these methods and finally a corresponding computer program product according to the main claims. Advantageous refinements are derived from the respective dependent claims and the following description.

The present invention is based on the realization that current methods for checking the plausibility of a sensor signal do not detect certain faults of a sensor. The detection reliability is able to be improved by comparing a sensor signal not only once with a reference signal or in each case once with a plurality of reference signals but, within a time cycle, a plurality of times with one or more reference signals. In this way, a faulty sensor signal may reliably be detected.

The present invention creates a method for detecting a suitable sensor signal for actuating a passenger protection arrangement of a vehicle, which includes the following steps:
  Carrying out a comparison between the sensor signal and at least one reference signal several times within a predetermined time interval, so as to obtain a plurality of comparison results; and
  Evaluating the sensor signal based on the plurality of comparison results, in order to detect a fault in the sensor signal.

The passenger protection arrangement may be an air bag, which is able to be activated in the case of a collision of the vehicle, in order to protect a passenger of the vehicle from injuries. Sensors may be situated in the vehicle so that they are able to detect collisions. The sensors may, for instance, be acceleration sensors, acoustic sensors or distance sensors. The sensor signal and the reference signal may be provided by different sensors situated in the vehicle. The sensor signal may be continually analyzed, in order to detect a collision of the vehicle For this purpose, the sensor signal may be compared to one or more threshold values. If a corresponding analysis of the sensor signal reveals that a collision of the vehicle is present or is directly ahead, provided the sensor signal has been evaluated as fault-free, the passenger protection arrangement may be actuated based on the sensor signal, that is, activated for example. The reference signal may also be suitable for detecting the collision. In the case of the fault-free functioning of a sensor providing the sensor signal and in the case of the sensor providing the reference signal, the sensor signal and the reference signal may have the same or a similar curve.

For example, the sensor signal and the reference signal may be offset in time with respect to each other or may have a different signal strength. Before the comparison, the sensor signal and the reference signal may be normalized and, in addition or alternatively, be delayed in time for their agreement in time. By the comparison of the sensor signal to the reference signal, a deviation may be determined between a value of the sensor signal and a value of the reference signal.

If the deviation is within a predetermined range, such a comparison result may give the information that the sensor signal is fault-free, at least with respect to the time of the comparison. If the deviation is outside the predetermined range, such a comparison result may give the information that the sensor signal is faulty, at least with respect to the time of the comparison. By carrying out the majority of comparisons within the predetermined time interval, a majority of pointers come about as to whether the sensor signal is fault-free or faulty, and with that, whether the sensor providing the sensor signal is fault-free or faulty.

According to one exemplary embodiment, the comparison may be carried out cyclically within the predetermined time interval in the step of carrying out. Cyclically may mean that between two successive comparisons there are equal time spans in each case. Because of the cyclical carrying out, comparison results are continually generated which are able to be evaluated.

The comparison may alternatingly be carried out using a first reference signal and at least one second reference signal. If the sensor signal is compared to a plurality of reference signals, such as three reference signals, the sensor signal may be compared first to the first reference signal, then to the second reference signal, then to a further reference signal and subsequently, starting over again, again to the first reference signal. In this context, a time interval between comparisons to the first and the second reference signal may be the same as, or different from a time interval between comparisons to the second and the further reference signal.

According to one specific embodiment, the method may include a step of checking as to whether a value of the sensor signal lies within a predetermined value range. The step of carrying out may be performed if the value of the sensor signal lies within the predetermined value range. For instance, the value of the sensor signal may lie within the predetermined value range if the sensor signal exceeds a predetermined threshold value. This may be about a starting threshold for an algorithm for actuating the passenger protection arrangement. In this way it is not necessary to carry out continually the steps for checking the sensor signals. Instead, the sensor signal is only checked if an event is detected, for example, or predicted, on the basis of which the triggering of the passenger protection arrangement appears to be required.

According to one specific embodiment, the sensor signal is able to be evaluated as being faulty if a predetermined number of the plurality of comparison results indicate a minimum deviation between the one sensor signal and the at least one reference signal. In this way, the evaluation of the sensor signal depends not only on one decision, but is ensured via a plurality of decisions. A sensor signal may be evaluated as being fault-free, for example, if the majority or a certain proportion of the comparison results point out that the sensor signal is fault-free. The other way round, the sensor signal may be evaluated as being faulty if the majority or a certain proportion of the comparison results point out that the sensor signal is faulty.

In this instance, the sensor signal and the at least one reference signal may represent signals of sensors that are situated at different positions in the vehicle. The minimum deviation is able to be a function of the positions of the sensors. A value of the minimum deviation may be fixedly specified. Alternatively, a collision may be classified with respect to a collision type or collision severity, and as a function of the classification, a suitable minimum deviation may be selected. If the sensor signal is compared to different reference signals, for each of the reference signals its own minimum deviation is able to be defined Also, sensor signals and the at least one reference signal may represent signals of sensors which are situated in the vehicle, and the minimum deviation being a function of measuring tolerances of the sensors. In this way, it may be avoided that the evaluation of the sensor signals leads to a false result based on measuring tolerances. The lower the measuring tolerances, the lower the minimum deviation may be selected.

The present invention further creates a method for actuating a passenger protection arrangement of a vehicle, which has the following steps:

Receiving a sensor signal via an interface to a sensor;
Receiving at least one reference signal via an interface to at least one reference sensor;
Checking the sensor signal using a method according to one specific embodiment of the present invention; and
Actuating the passenger protection arrangement based on the sensor signal if no fault is detected when the sensor signal is checked.

Consequently, the approach according to the present invention may advantageously be used in connection with known algorithms for actuating passenger protection arrangement.

The present invention further creates a device that is developed to carry out or implement the steps of the method according to the present invention in corresponding pieces of equipment. This embodiment variant of the present invention in the form of a device may also be used quickly and efficiently to achieve the object on which the present invention is based.

In the case at hand, by a device one may understand an electrical device which processes sensor signals and outputs control signals as a function thereof. The device may be configured as a control unit. The device may have an interface developed as hardware and/or software. In a hardware implementation, the interfaces may be part of a so-called system ASIC, for instance, which contains various functionalities of the device. However, it is also possible for the interfaces to represent discrete, integrated switching circuits on their own or to be at least partially made up of discrete components. In a software design, the interfaces may be software modules which are present on a microcontroller in addition to other software modules, for example.

Advantageous is also a computer program product having program code that may be stored on a machine-readable carrier such as a semiconductor memory, a hard-disk memory or an optical memory, which is used to implement the method according to one of the specific embodiments described above when the program is executed on a device that corresponds to a computer.

In the following text, the present invention will be explained in greater detail with reference to the attached drawings and by way of example.

DETAILED DESCRIPTION

Figure 1:
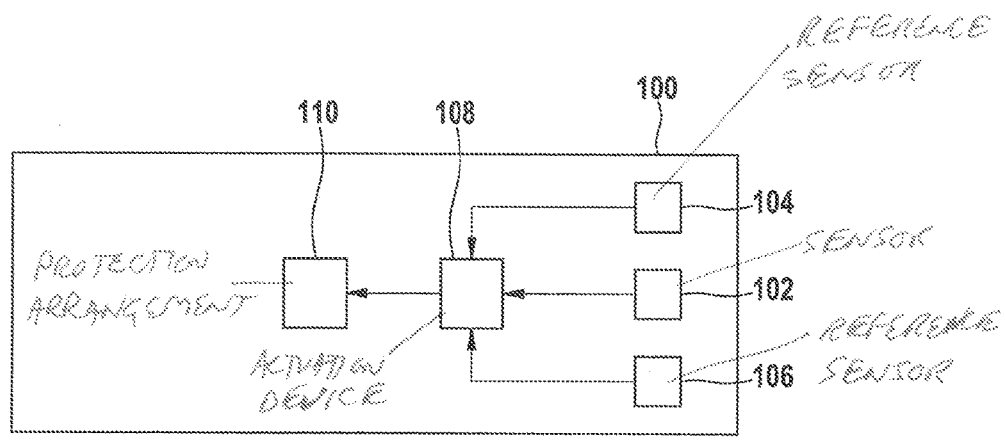
FIG. 1 shows a block diagram of an exemplary embodiment of the present invention.

In the subsequent description of exemplary embodiments of the present invention, the same or similar reference numerals are used for the elements that are shown in the various figures and act similarly; a repeated description of these elements has been dispensed with.

FIG. 1 shows a schematic representation of a vehicle 100 having a device according to an exemplary embodiment of the present invention. In vehicle 100, a sensor 102, two reference sensors 104, 106 and a device 108, for actuating passenger protection arrangement 110, are situated. Sensor 102 is configured to provide a signal to the device 108. Corresponding to this, reference sensors 104, 106 are developed for each to provide a reference sensor signal to device 108. To do this, sensors 102, 104, 106 are connected to device 108 via suitable interfaces. Sensors 102, 104, 106 are each developed to detect a collision of vehicle 100 with an object. Sensors 102, 104, 106 may also be developed to recognize another state of the vehicle that is dangerous for the passengers, such as a rollover. Device 108 is developed in order, based on at least one of the signals of sensors 102, 104, 106, to detect the collision or an equivalent other dangerous state of the vehicle, and responding to this, to activate the passenger protection arrangement. Passenger protection arrangement 110 may be an air bag of vehicle 100, for example. Corresponding to this, device 108 may be an air bag control unit.

According to this exemplary embodiment, device 108 is developed in order, based on the signal of sensor 102, to detect a collision of vehicle 100. Responding to the detection of the collision, device 108 is developed to check a signal curve of the signal of sensor 102 or individual values of the signal of sensor 102 for their correctness. To do this, device 108 is configured to compare the signal of sensor 102 to the signals of reference sensors 104, 106. Corresponding comparisons are carried out within a predetermined time span after the detection of the collision. In this context, the signal of sensor 102 is compared continually and several times to the signals of reference sensors 104, 106. The comparisons may be carried out according to a predetermined sequence pattern, for example cyclically. Device 108 is developed so as to activate passenger protection arrangement 110 only if the comparisons reveal that the signal of sensor 102 is plausible. Furthermore, device 108 is developed so as not to activate passenger protection arrangement 110 if the comparisons reveal that the signal of sensor 102 is not plausible.

Sensors 102, 104, 106 are able to be situated at different positions in vehicle 100. Sensors 102, 104, 106 are able to be based on the same, or on different sensor principles. Sensors 102, 104, 106 are shown in exemplary fashion. Additional reference sensors may also be used, whose signals are received by device 108 and are used to check the sensor signal of sensor 102. According to one exemplary embodiment, for the certain triggering of air bag control units 110 in a vehicle 100, the triggering of an air bag control unit 110 is always tied to a main sensor 102, which generates the determining signal, and is additionally tied to a plausibility sensor 104, 106, which has to be enabled. In general, the function of a sensor 102 in the system is ensured by comparing the amplitude of the output values to fixedly set thresholds. For this, for example, upon switching on, an offset regulation in a corridor about the null position may be carried out, or the signal amplitude may be held longer than one second at the measuring range stop.

For the reliable detection of faults of sensor 102, a fault detection is carried out by a plausibility check. For the fault detection, the plausibility check of the measured value of a sensor, let us say sensor 104 or sensor 106, for example, is broadened to include the measured value of two or more sensors, such as sensors 104, 106, and optionally additional sensors not shown in FIG. 1. According to this exemplary embodiment, the signals output by sensor 102 are compared cyclically to the signals of redundancy sensors 104, 106 that are present in the system.

In particular, an output value of sensor 102 is compared to a redundancy sensor 104, 106, that is located in the system, if sensor 102, or rather the signal output by sensor 102, reaches a certain value. Such a certain value, for instance, may be an algorithm starting threshold. If this comparison, within a specified time cycle, repeatedly reveals large deviations, sensor 102 is graded as faulty, so as to initiate appropriate measures in the system. The appropriate measures may include, for instance, switching off sensor 102 or components for actuating air bag 110. The admissible deviations come about according to this exemplary embodiment from the placing of sensors 102, 104, 106 in vehicle 100 and their measuring tolerances.

Figure 2:
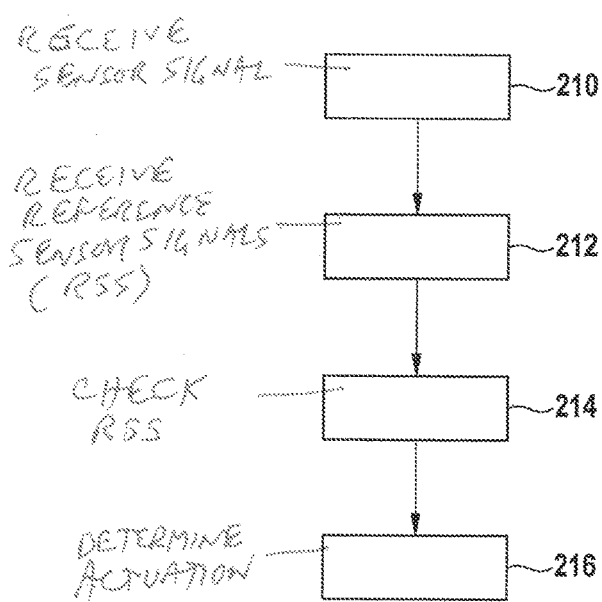
FIG. 2 shows a flow chart of an exemplary embodiment of the present invention.

FIG. 2 shows a flow chart of a method for actuating a passenger protection arrangement of a vehicle according to one exemplary embodiment of the present invention. The method is able to be carried out by device 108 shown in FIG. 1, for example.

In a step 210, a sensor signal is received via an interface. This may be about the sensor signal of sensor 102 shown in FIG. 1. In a step 212, additional reference sensor signals are received via one or more additional interfaces. This may be about the reference sensor signals of sensors 104, 106 shown in FIG. 1.

In a step 214, the sensor signal received may be checked based on the reference sensor signals. Step 214 may be carried out continually or in response to the detection of a collision. The detection of a collision may take place based on the sensor signal received or based on further data. For example, the detection may take place based on a comparison of the sensor signal to a specified threshold. In step 214, the sensor signal received may continually be compared within a predetermined time span to the reference sensor signals. The predetermined time span may be started at the point in time of the detection of the collision. During the predetermined time span, steps 210, 212 may be carried out continually, so that current values of the sensor signals and the reference sensor signals are continually available. Each comparison is able to supply a comparison result.

The comparison results may be continually evaluated or may be stored and evaluated after expiration of the predetermined time span, for example. The sensor signal received is evaluated based on an evaluation of the comparison results. The valuation may reveal that the sensor signal received is plausible, and is consequently suitable for actuating the passenger protection arrangement. The valuation may also reveal that the sensor signal received is not plausible, and is consequently not suitable for actuating the passenger protection arrangement. If the valuation reveals that the sensor signal received is plausible, and if the collision is graded so that the triggering of the passenger protection arrangement is meaningful, then the passenger protection arrangement are actuated in a step 216, that is, triggered, for example.

Figure 3:
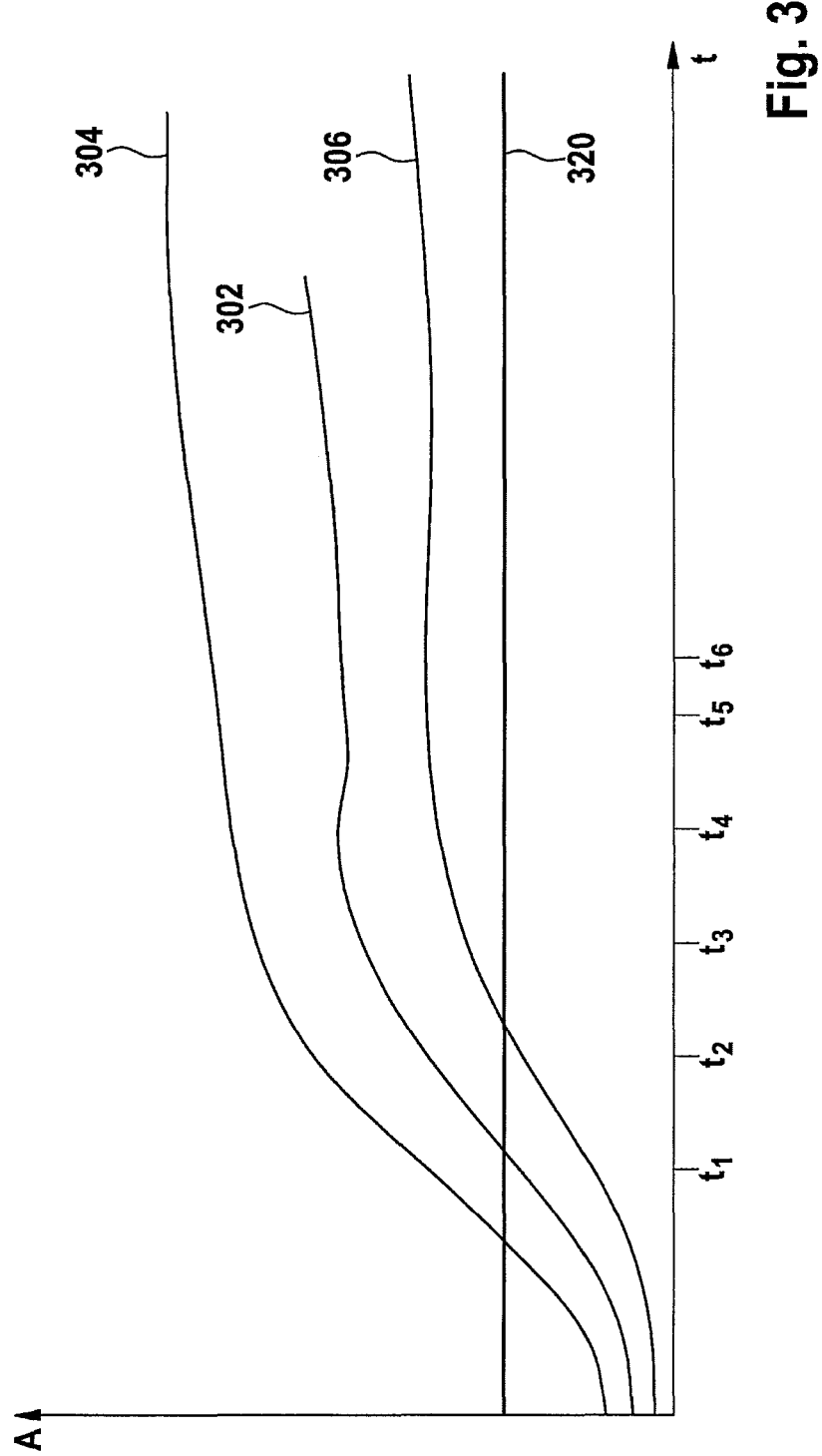
FIG. 3 shows signal curves according to an exemplary embodiment of the present invention.

FIG. 3 shows a sequence of a valuation of a sensor signal 302, according to an exemplary embodiment of the present invention. Besides sensor signal 302, a first reference signal 304 and a second reference signal 306 are shown. Signals 302, 304, 306 are plotted in a graph, time t being plotted on the abscissa and amplitude A of signals 302, 304, 306 being plotted on the ordinate. The curves of signals 302, 304, 306 are shown in exemplary fashion and purely schematically. Signals 302, 304, 306 are able to be generated by sensors 102, 104, 106 shown in FIG. 1, for example. At a time t1, sensor signal 302 crosses triggering threshold 320. A time window is started at the crossing of triggering threshold 320, which extends from time t1 to time t6. During the time window, sensor signal 302 is compared cyclically to reference signals 304, 306.

According to this exemplary embodiment, sensor signal 302 is compared at time t2 to first reference sensor signal 304, at time t3 to second reference sensor signal 306, at time t4 again to first reference sensor signal 304 and at time t5 again to second reference sensor signal 306. The distances between times t1, t2, t3, t4, t5 may be equal. From the comparisons to times t2, t3, t4, t5 there is revealed in each case a distance between a value of sensor signal 302 and a value of reference signal 304, 306, to which sensor signal 302 was compared at the respective time t2, t3, t4, t5. If a distance, that comes about from a comparison, is less than a specified minimum distance, sensor signal 302 is assumed to be fault-free with respect to time t2, t3, t4, t5, at which the comparison was carried out. If the distance, that comes about from the comparison, is greater than the specified minimum distance, sensor signal 302 is assumed to be faulty with respect to time t2, t3, t4, t5, at which the comparison was carried out. From the distances revealed by the comparisons to times t2, t3, t4, t5 and the comparison results revealed from this, it is determined whether sensor signal 302 is plausible. If sensor signal 302 is valued as being plausible, actuation of a passenger protection arrangement is able to take place, based on sensor signal 302, at time t6, for instance, that is, after the expiration of the time window.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method steps according to the present invention may be carried out repeatedly and also performed in a sequence other than the one described.

What is claimed is:

1. A method for checking a sensor signal from a sensor suitable for actuating a passenger protection arrangement of a vehicle, the method comprising:
    comparing the sensor signal and at least two reference signals from at least two reference plausibility sensors repeatedly within a predetermined time interval after a detection of a collision or a rollover, so as to obtain a plurality of comparison results; and evaluating the sensor signal based on the plurality of comparison results to detect a fault in the sensor signal after the detection of the collision or the rollover;

wherein the passenger protection arrangement is actuated based on the sensor signal, if no fault is detected when the sensor signal is checked, and wherein the sensor signal is determined to be plausible based on distances derived by comparisons of times between predetermined time intervals, and wherein each of the distances is between a value of the sensor signal and a value of one of the reference signals to which the value of the sensor signal was compared at a respective time.

2. The method of claim 1, wherein the comparing is performed cyclically within the predetermined time intervals.

3. The method of claim 1, wherein the comparing is performed in a continually alternating manner using a first reference signal and at least one second reference signal.

4. The method of claim 1, further comprising:
checking whether a value of the sensor signal lies within a predetermined value range, wherein the comparing is performed if the value of the sensor signal lies within the predetermined value range.

5. The method of claim 4, wherein the sensor signal and the at least one reference signal represent signals of the sensors, which are situated at different positions in the vehicle and in which a minimum deviation is a function of positions of the sensors.

6. The method of claim 1, wherein the sensor signal is evaluated as being faulty if a predetermined number of the plurality of comparison results indicate a minimum deviation between the one sensor signal and the at least one reference signal.

7. The method of claim 6, wherein the sensor signal and the at least one reference signal represent signals of sensors, which are situated in the vehicle, and in which the minimum deviation is a function of the measuring tolerances of the sensors.

8. The method of claim 1, wherein the passenger protection arrangement is actuated based on the sensor signal, if no fault is detected when the sensor signal is checked.

9. A method for actuating a passenger protection arrangement of a vehicle, the method comprising:
receiving a sensor signal via an interface to a sensor;
receiving at least two reference signals via an interface to at least two reference plausibility sensors;
checking the sensor signal by comparing the sensor signal and at least two reference signals repeatedly within a predetermined time interval after a detection of a collision or a rollover, so as to obtain a plurality of comparison results, and evaluating the sensor signal based on the plurality of comparison results to detect a fault in the sensor signal after the detection of the collision or the rollover; and
actuating the passenger protection arrangement based on the sensor signal, if no fault is detected when the sensor signal is checked;
wherein the sensor signal is determined to be plausible based on distances derived by comparisons of times between predetermined time intervals, and wherein each of the distances is between a value of the sensor signal and a value of one of the reference signals to which the value of the sensor signal was compared at a respective time.

10. A device for checking a sensor signal from a sensor suitable for actuating a passenger protection arrangement of a vehicle, comprising:
a comparing arrangement to compare the sensor signal and at least two reference signals from at least two reference plausibility sensors repeatedly within a predetermined time interval after a detection of a collision or a rollover, so as to obtain a plurality of comparison results; and
an evaluating arrangement to evaluate the sensor signal based on the plurality of comparison results to detect a fault in the sensor signal after the detection of the collision or the rollover;
wherein a passenger protection arrangement is actuated based on the sensor signal, if no fault is detected when the sensor signal is checked, and
wherein the sensor signal is determined to be plausible based on distances derived by comparisons of times between predetermined time intervals, and wherein each of the distances is between a value of the sensor signal and a value of one of the reference signals to which the value of the sensor signal was compared at a respective time.

11. The device of claim 10, wherein the passenger protection arrangement is actuated based on the sensor signal, if no fault is detected when the sensor signal is checked.

12. A non-transitory computer readable medium having a computer program, which is executable by a processor, comprising:
a program code arrangement having program code for checking a sensor signal from a sensor suitable for actuating a passenger protection arrangement of a vehicle, by performing the following:
comparing the sensor signal and at least two reference signals from at least two reference plausibility sensors repeatedly within a predetermined time interval after a detection of a collision or a rollover, so as to obtain a plurality of comparison results; and
evaluating the sensor signal based on the plurality of comparison results to detect a fault in the sensor signal after the detection of the collision or the rollover;
wherein a passenger protection arrangement is actuated based on the sensor signal, if no fault is detected when the sensor signal is checked, and
wherein the sensor signal is determined to be plausible based on distances derived by comparisons of times between predetermined time intervals, and wherein each of the distances is between a value of the sensor signal and a value of one of the reference signals to which the value of the sensor signal was compared at a respective time.

13. The computer readable medium of claim 12, wherein a passenger protection arrangement is actuated based on the sensor signal, if no fault is detected when the sensor signal is checked.

* * * * *